United States Patent [19]

Chiba et al.

[11] Patent Number: 5,588,250

[45] Date of Patent: Dec. 31, 1996

[54] ADHESIVE INSECT TRAPPING HOUSING

[75] Inventors: Hiromi Chiba; Kenji Furumori, both of Osaka, Japan

[73] Assignees: Nitto Denko Corporation; Oct Co. Ltd., both of Osaka, Japan

[21] Appl. No.: 360,003

[22] Filed: Dec. 20, 1994

[30] Foreign Application Priority Data

Dec. 20, 1993 [JP] Japan .................... 5-319448

[51] Int. Cl.$^6$ .................................... A01M 1/14
[52] U.S. Cl. .................................... 43/114; 43/115
[58] Field of Search ................. 43/114, 115, 116, 43/117

[56] References Cited

U.S. PATENT DOCUMENTS

| | | | |
|---|---|---|---|
| 1,972,762 | 9/1934 | Drummond | 43/115 |
| 2,962,836 | 12/1960 | Hughes | 43/114 |
| 3,913,259 | 10/1975 | Nishimura et al. | 43/114 |
| 3,956,848 | 5/1976 | Job | 43/115 |
| 4,161,079 | 7/1979 | Hill | 43/114 |
| 4,208,828 | 6/1980 | Hall | 43/114 |
| 4,244,134 | 1/1981 | Otterson | 43/114 |
| 4,815,231 | 3/1989 | McQueen | 43/114 |

FOREIGN PATENT DOCUMENTS

| | | | |
|---|---|---|---|
| 0005224 | 2/1978 | Japan | 43/114 |
| 0858697 | 8/1981 | U.S.S.R. | 43/114 |

*Primary Examiner*—Kurt Rowan
*Attorney, Agent, or Firm*—Sughrue, Mion, Zinn, Macpeak & Seas

[57] ABSTRACT

A trap housing for trapping insects, which particularly allows an insect trapping adhesive sheet to be replaced with ease and which can trap a great number of insects efficiently, is provided. The adhesive trap housing is constructed so that a tray and a cover body having rectangular openings are pivotably joined with each other via hinge pieces and engagement members so as to allow the housing to be freely opened and closed. Retaining pieces are arranged on the corners of the tray so that an insect trapping adhesive sheet can be removably fixed thereto. In addition, a window is provided in the tray, and a curved portion projecting inward towards the tray is formed in a substantially middle portion of the cover body. Bird protecting barriers are attached to the openings of the cover body.

13 Claims, 6 Drawing Sheets

5,588,250

ADHESIVE INSECT TRAPPING HOUSING

BACKGROUND OF THE INVENTION

1. Field of the Invention

The invention relates to housings capable of trapping flying insects such as moths. More particularly, the invention is directed to an adhesive trap housing that allows for the attachment and replacement of an insect trapping adhesive sheet with a simple operation, and is capable of trapping a great number of insects efficiently.

2. Related Art

A generally commercially available conventional adhesive trap housing of this type is shown in FIG. 9. The adhesive trap housing 1 shown in FIG. 9 has the following structure. A triangular housing 2 is formed by folding a flat piece of cardboard into a triangular prism, the flat piece of cardboard being prepared by laminating a plastic film on the surfaces of raw corrugated cardboard. Hanging strings 3 are attached to two points on the apex of the triangular housing 2. An odorant member (not shown) that gradually emits the odor of an attractant such as a sex pheromone is fixed to the inner ceiling. In addition, an insect trapping adhesive sheet 4 is put on the inner bottom surface and fixed on the bottom plate with a clip 5.

Adhesive trap housing 1 formed of triangular housing 2 has small triangular openings which make the open area on both sides narrow. As a result, the number of insects entering the housing is decreased, and the number of insects trapped therein is small. In addition, since the housing is a triangular prism simply made of three flat panels, an insect that has entered the housing from the opening on one side can exit the opening on the other side, further reducing the number of trapped insects.

Moreover, once assembled, the triangular housing 2 is hard to open. Therefore, to replace the insect trapping adhesive sheet 4, the insect trapping adhesive sheet 4 has to be removed and a new one has to be inserted and fixed through the narrow side openings. Since the sheet 4 has an adhesive agent applied thereto, the handling of it is cumbersome and the operation becomes thus extremely complicated. Particularly, since the trap is used while hung on a tree, replacement of the insect trapping adhesive sheet 4 is accomplished either by taking the adhesive trap housing 1 down from the tree or by using a ladder every time such replacement is required.

It is an object of the present invention to provide an adhesive trap housing not only capable of increasing the number of insects entering from the openings and decreasing the number of insects flying away by passing through the housing, but also allowing the insect trapping adhesive sheet attached to the inside to be replaced in an extremely simple manner.

SUMMARY OF THE INVENTION

The adhesive trap housing of the present invention has been designed to fulfill the above and other objects. The adhesive insect trapping housing of the present invention includes a hollow cover body, having at least three sides, said sides being a top side, a left side, and a right side, a substantially middle portion of said top side being curved and projecting inward; an odorant member, disposed on the interior of said cover body, for attracting insects; and a tray, disposed facing said top side of said cover body, onto which the adhesive sheet is mounted, wherein said housing has a first end and a second end, said ends being open to air and having substantially rectangular openings. The tray may be integral with the cover body, or first hinge members may be disposed substantially at a bottom portion of one of said left side and said right side of said cover body, with corresponding second hinge members disposed on said tray and engaging said first hinge members, so that said tray is pivotably attached to said cover body by engagement of said first and second hinge members. The housing also includes engagement members, disposed on said tray on a side opposite said second hinge members and engageable with said cover body, so as to close said cover body with said tray.

The adhesive insect trapping housing may include bird protecting barriers provided at the openings of the cover body, for preventing birds from entering said housing. The tray may include at least one window, for removing the insect trapping adhesive sheet. The tray may also include retaining pieces for allowing the insect trapping adhesive sheet to be releasably fixed to said tray provided on an inner face of said tray that faces said top side of said cover body.

In an alternative embodiment, the cover body is comprised of a front cover half and a rear cover half, said cover halves being provided with projections and corresponding insertion holes, said cover halves fitting together by inserting said projections into said insertion holes.

Since the openings of the cover body are substantially rectangular in the invention, the housing has the openings on both sides as wide as the opening in the middle. This structure contributes to increasing tile opening area, thereby facilitating insects to enter. In addition, since the substantially middle portion of the ceiling of the cover body is curved and projected inward, an attractant such as a sex pheromone can be efficiently scattered by turbulence of air. Insects entering from either side of the housing are restricted by the curved portion so that the insects are caused to fly in o an undulating path. As a result, the insects come in contact with the insect trapping adhesive sheet attached to the tray and are trapped without fail, which in turn contributes to reducing the number of insects merely flying away by passing through the housing. Hence, the insect trapping rate can be improved.

Since the cover body is assembled to the tray so as to be freely opened and closed in the invention, the replacement of the insect trapping adhesive sheet can be made in a simple manner involving a single hand. That is, the cover body is opened and the insect trapping adhesive sheet on the tray is removed by a single hand simply, stably, and reliably. As a result, the adhesive trap housing of the invention allows the insect trapping adhesive sheet to be replaced with the adhesive trap housing being hung on a tree.

Since the retaining pieces for fixing the insect trapping adhesive sheet are provided on the bottom plate of the tray in the invention, the insect trapping adhesive sheet put on the tray can be fixed to or removed from the tray by utilizing these retaining pieces. In addition, since the window is provided in the tray, the insect trapping adhesive sheet placed on the tray can be raised from the back of the tray by inserting fingers through the window to remove the sheet from the tray with ease.

BRIEF DESCRIPTION OF THE DRAWINGS

FIG. 5 (B) is a diagram illustrative of how the insect trapping adhesive sheet is removed.

DETAILED DESCRIPTION OF THE PREFERRED EMBODIMENTS

An adhesive trap housing, which is an embodiment of the invention, will now be described specifically with reference to the drawings.

Figure 1:
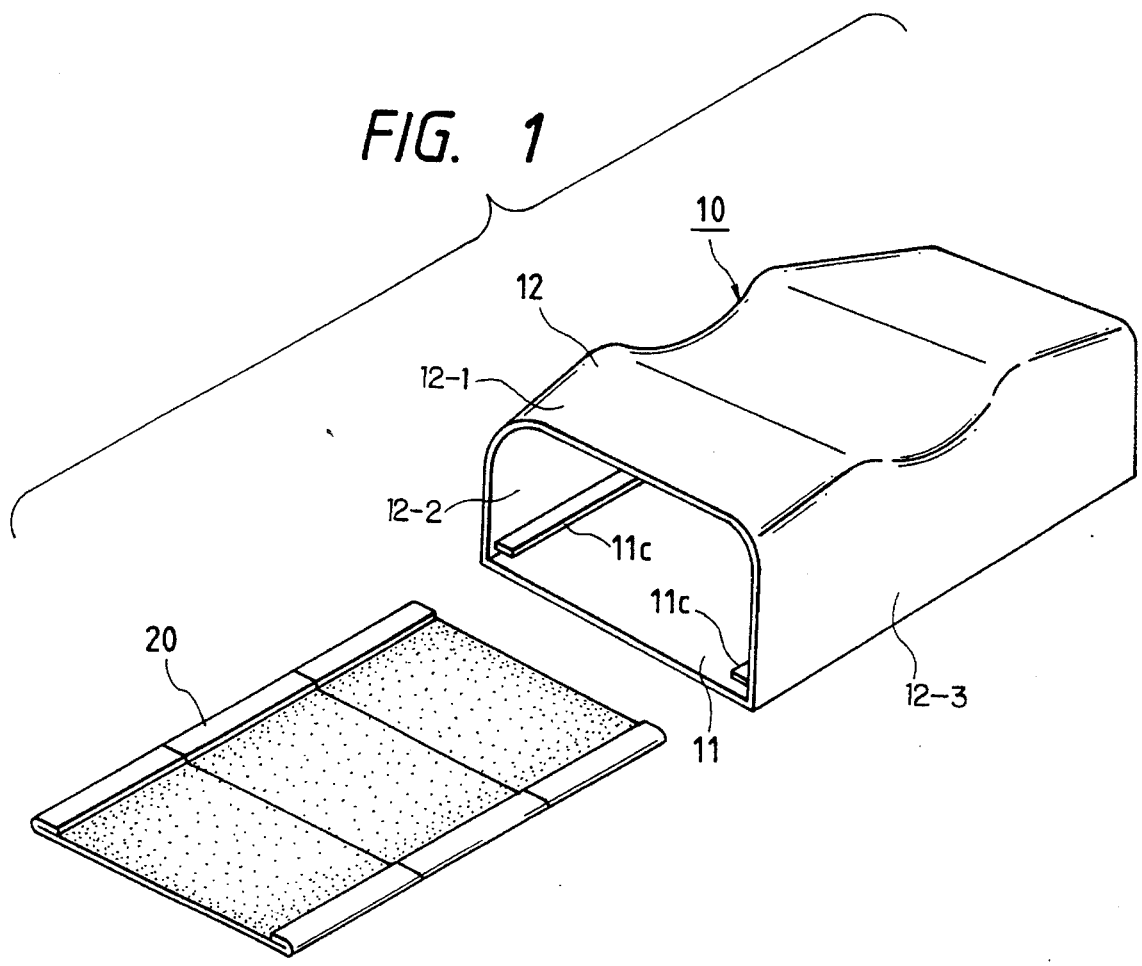
FIG. 1 is a perspective view illustrative of a construction of an adhesive trap housing according to a first aspect of the invention.

The adhesive trap housing according to the first aspect of the invention will be described with reference to FIG. 1. FIG. 1 shows a basic construction of an adhesive trap housing of the invention. A simple general structure implemented by a single-piece housing is a feature of the invention. That is, reference numeral 10 denotes the adhesive trap housing according to the first aspect of the invention, which is integrally formed of a bottom plate-like tray 11 and a cover body 12.

As shown in FIG. 1, the cover body 12 has substantially rectangular openings on both back and front ends. A curved portion 12c is formed in a substantially middle portion of the ceiling (top side wall) of the cover body 12 so as to be curved and projected inward, so that the ceiling in the middle portion is lower than the ceiling at both ends. The cover futher includes a left side wall 12-2 and a right side wall 12-3. Guide members 11c are arranged at both sides on the inner bottom of the tray 11 so that an insect trapping adhesive sheet 20 can be slidably inserted and removed.

In FIGS. 2 to 8, in alternative arrangement, the adhesive trap housing is formed by a combination of a tray 11 and a cover body 12 that is pivotably attached to the tray 11 so that the cover body 12 can be freely opened and closed. The tray 11 is formed of a bottom plate 11a and side plates 11b on both sides. A round window 13 is provided at the center of the bottom plate 11a. In addition, the bottom plate 11a has small windows around the round window 13 in radial directions in order to make the whole structure light as well as to reduce material costs. Retaining pieces 14 are arranged on the four corners of the bottom plate 11a (see FIG. 3). The retaining pieces 14 serve to hold an insect trapping adhesive sheet, which will be described later. Further, hinge pieces 15a and engagement members 16a, each having a predetermined structure, are arranged on the outer surfaces of the side plates 11b of the tray 11 so as to project therefrom, respectively.

The cover body 12 has substantially rectangular openings on both left and right sides. As apparent particularly from FIG. 2, the cover body 12 is formed of two cover members 12a, 12b that are symmetrical with each other. These two cover members 12a, 12b are joined with each other through a combination of a plurality of projections 17 and corresponding insertion holes 18 that can have the projections 17 inserted thereinto and retained therein. The cover body 12 is divided into two parts to serve the purpose of inexpensively manufacturing the cover members 12a, 12b on a mass production basis using a small injection molding machine. Alternatively, the cover body 12 may be one piece.

From a single outer surface of the cover body 12 project hinge pieces 15b that can be hinged with the hinge pieces 15a of the tray 11. From the other outer surface of the cover body 12 project engagement members (not shown) engageable with the engagement members 16a. From the top of the left and right openings of the cover body 12 project hooking members 19 for hanging, respectively. These hooking members 19 are designed so that either a cord or a band can be hooked. The cover body 12 has a curved portion 12c that is curved and projected inward.

Figure 2:
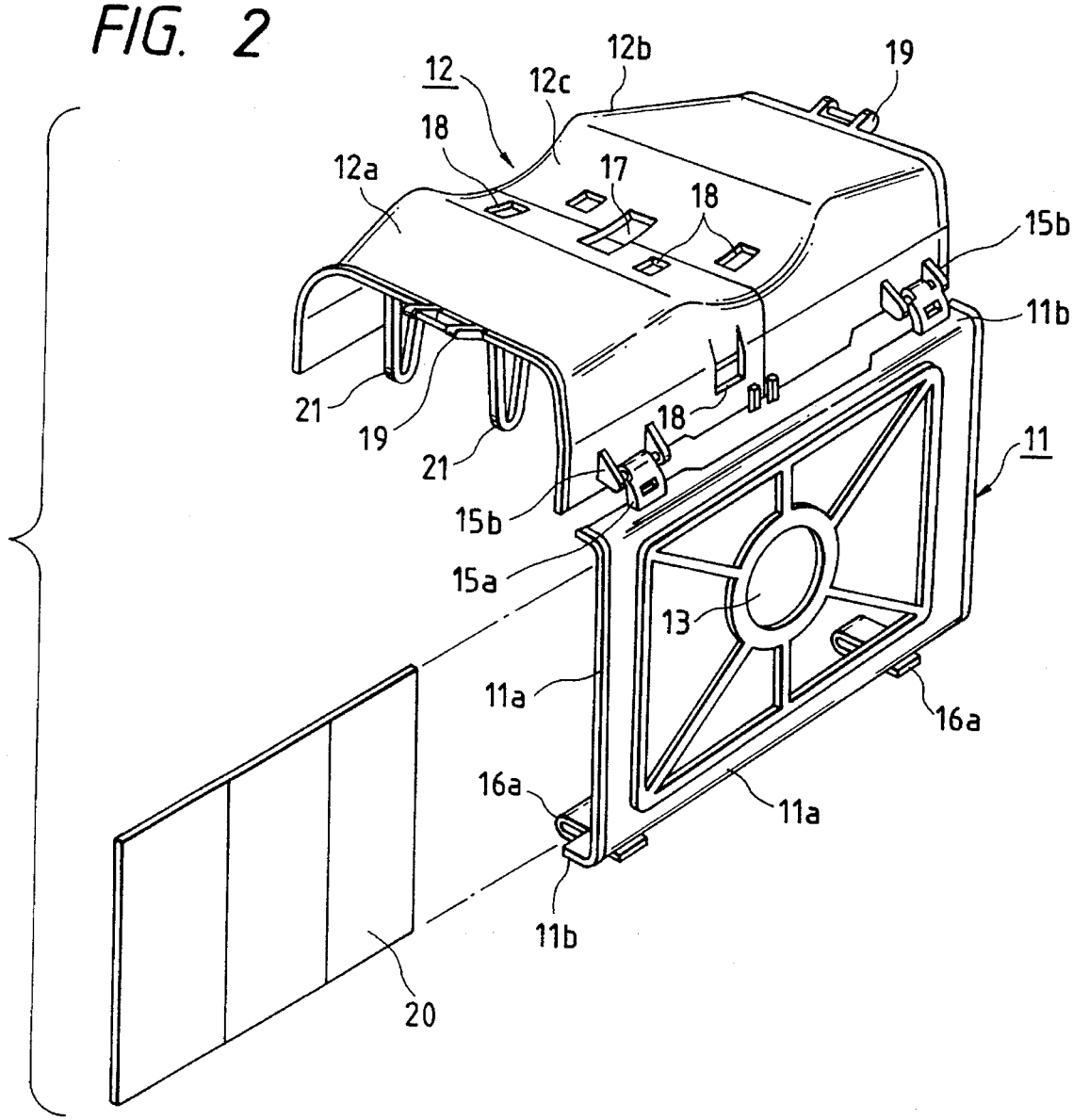
FIG. 2 is a perspective view illustrative of a construction of an adhesive trap housing according to a second aspect of the invention.
Figure 3:
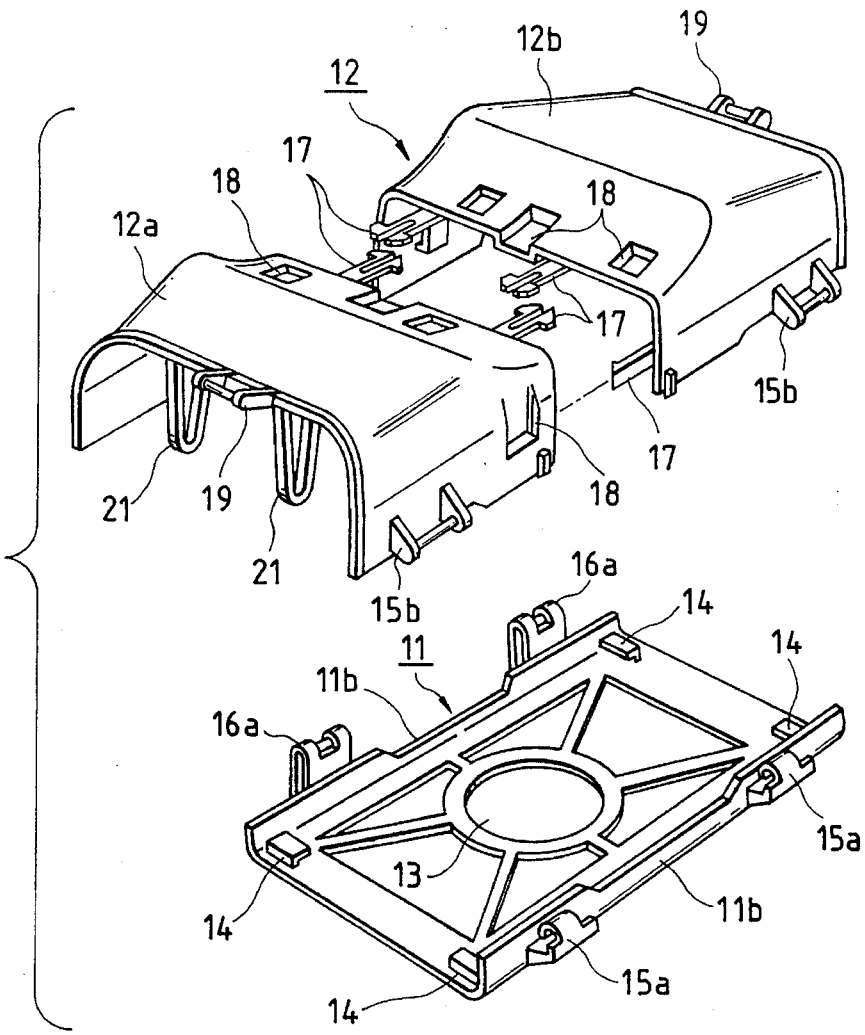
FIG. 3 is a diagram illustrative of components of FIG. 2
Figure 4:
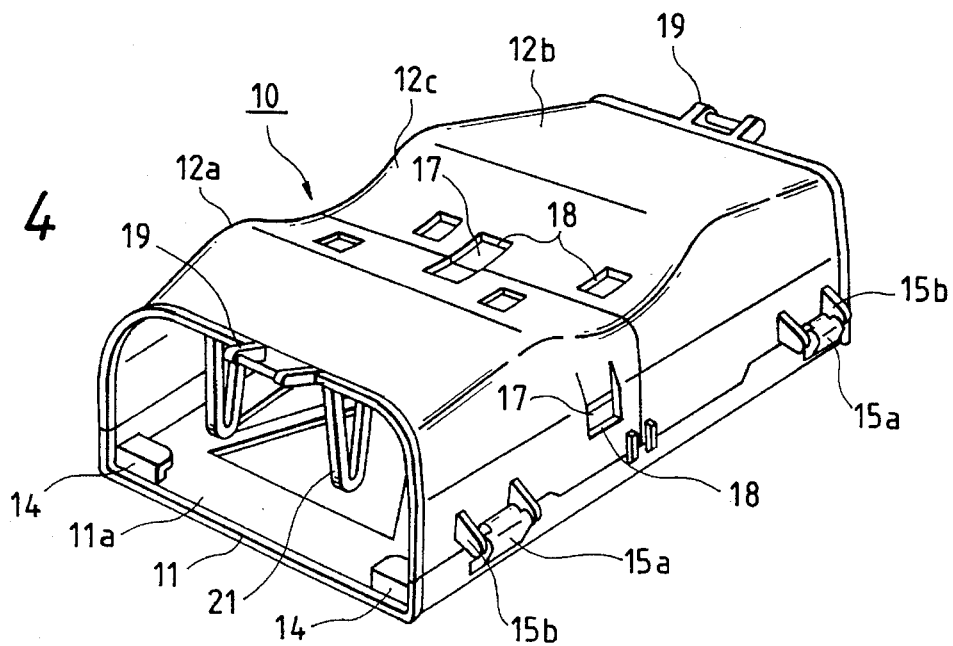
FIG. 4 is a perspective view after the components are assembled.
Figure 5A:
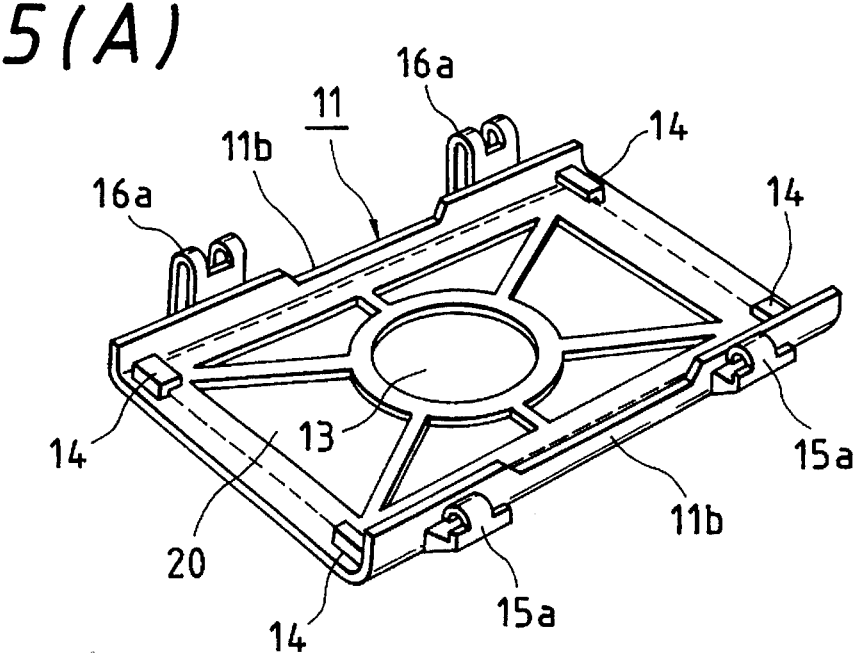
FIG. 5 (A) is a perspective view of a tray with an insect trapping adhesive sheet attached thereto.
Figure 5B:
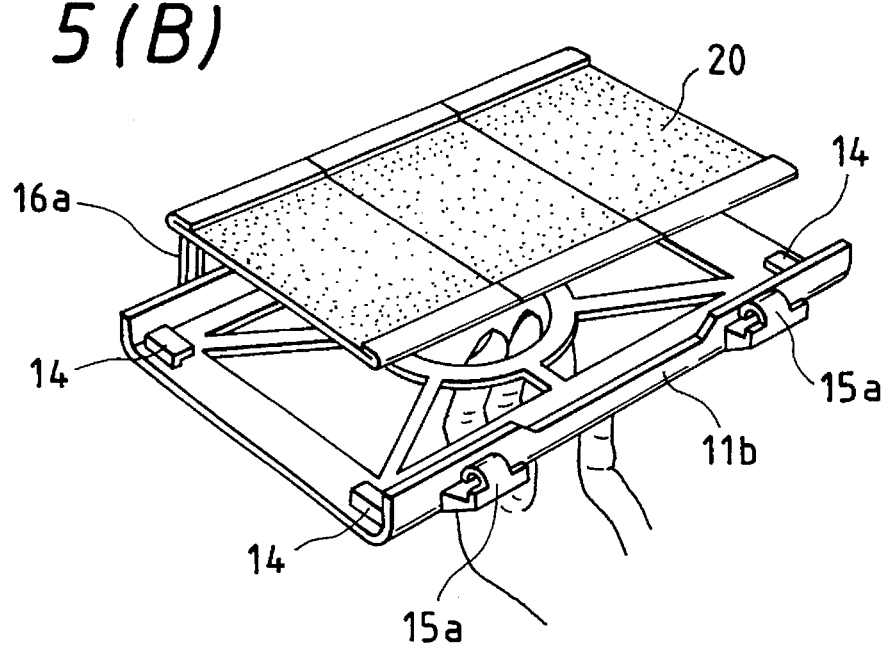

Reference numeral 20 denotes the insect trapping adhesive sheet, which is designed to be, e.g., folded in three for storage before use. As shown particularly in FIG. 5 (A) (represented by dashed lines), the insect trapping adhesive sheet 20 can be fixed to the tray 11 with ease by inserting the respective corners thereof into the retaining pieces 14 after placement on the tray 11. In addition, the insect trapping adhesive sheet 20 can be removed from the tray 11 with ease by inserting fingers into the round window 13 from the back of the tray 11 as shown in FIG. 5 (B) after the adhesive trap housing 10 is opened as shown in FIG. 2. Moreover, the adhesive trap housing 10 is designed so that the tray 11 is opened from the cover 12 with ease as shown in FIG. 2 by disengaging the engagement members 16a, 16b with one hand.

Figure 7:
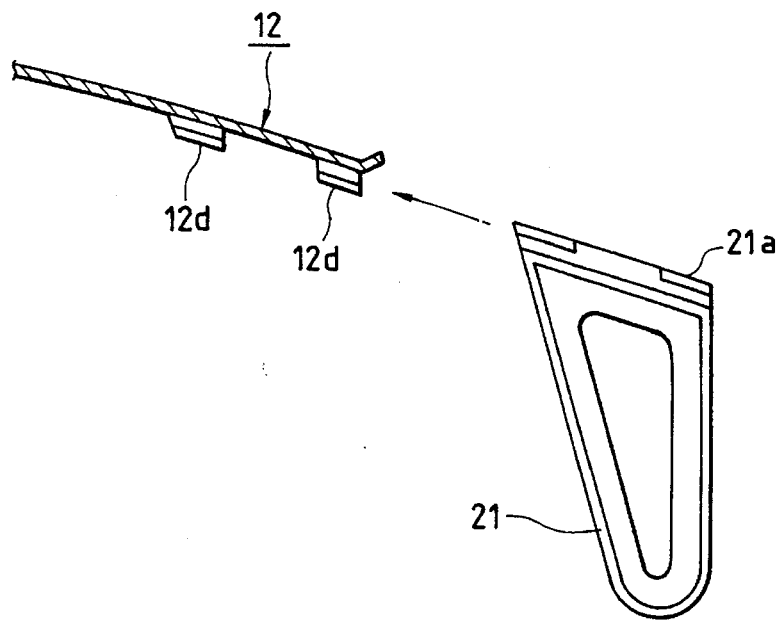
FIG. 7 is a diagram illustrative of how a wild bird protecting barrier is attached to a cover body.
Figure 8:
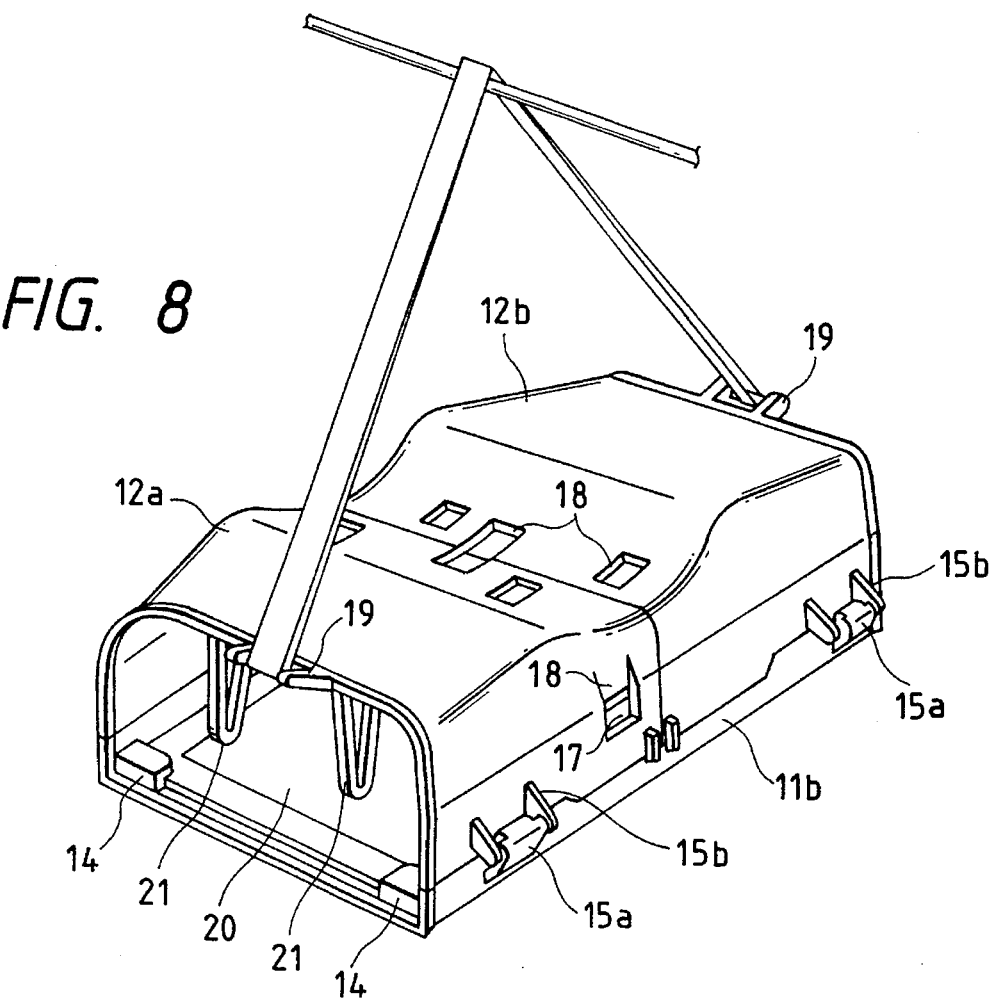
FIG. 8 is a diagram showing the appearance of the adhesive trap housing used while put on a tree.
Figure 9:
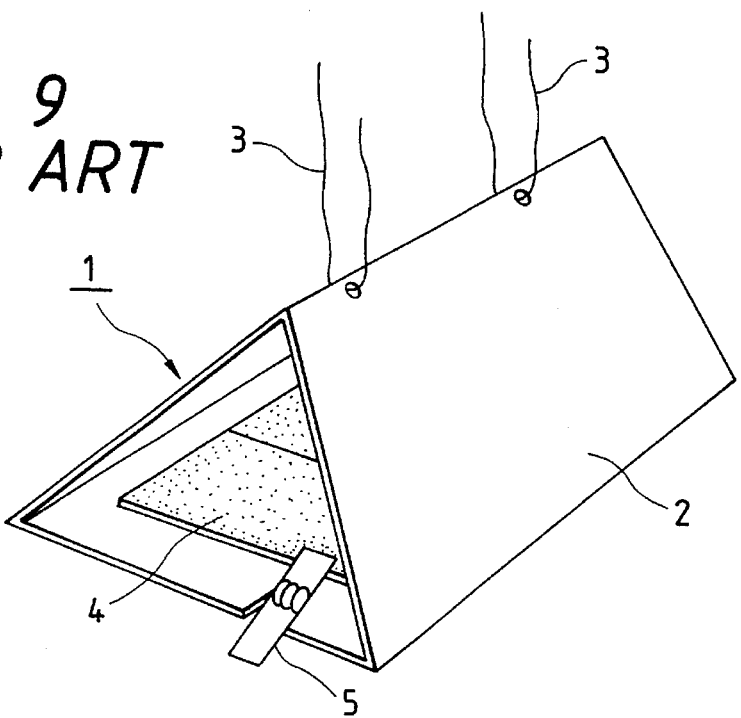
FIG. 9 is a perspective view of a conventional adhesive trap housing.

Reference numeral 21 denotes a wild bird protecting barrier, which is designed to be attached to the cover body 12 with ease by inserting a head portion 21a thereof into insertion pieces 12d arranged on the ceiling surface of the opening on each of both sides of the cover body 12 as shown particularly in FIGS. 7 and 8. The attachment of the wild bird protecting barriers 21 to the openings prevents wild birds aiming at the trapped insects from entering into the adhesive trap housing 10.

Figure 6:
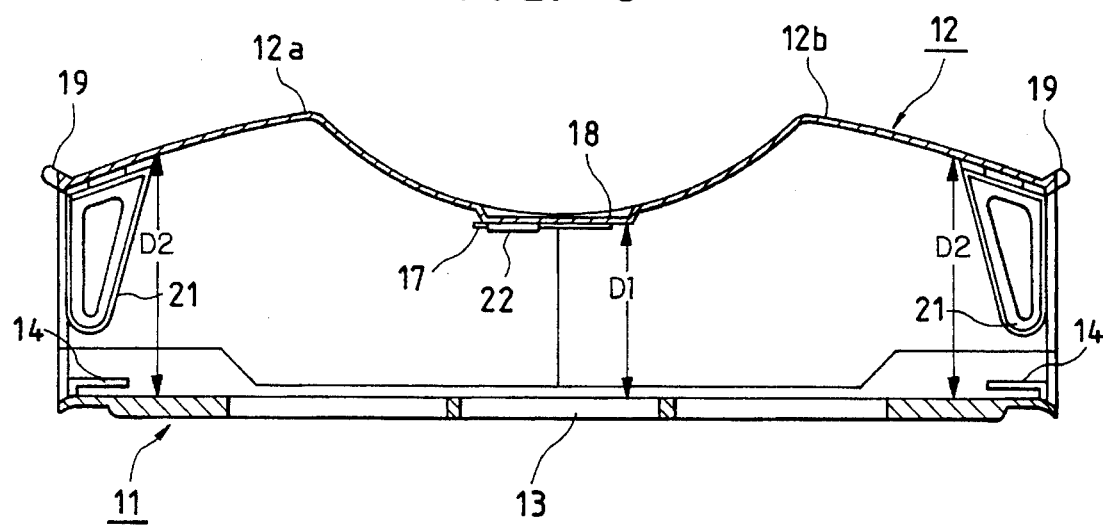
FIG. 6 is a longitudinal sectional view of FIG. 4.

As shown particularly in FIG. 2, the cover body 12 has the curved portion 12c formed with the substantially middle portion of the ceiling thereof curved, so that the ceiling at this portion is low. As a result of this design, turbulence is produced to allow particles of an attractant to be scattered efficiently by winds. Further, the curved portion 12c helps an insect that enters from the openings of the adhesive trap housing 10 to advance in an undulating path inside the adhesive trap housing 10. As best illustrated in FIG. 6, reference numeral 22 denotes an odorant member that can emit the odor of an attractant such as a sex pheromone. The odorant member is attached to the ceiling at the curved portion 12c. As shown, a first distance D1 from the tray 11 to the inwardly curved middle portion is less than a second distance D2 from the tray to the end portions.

The tray 11, the cover members 12a, 12b of the cover body 12, and the bird protecting barriers 21 can be shipped while overlapped one upon another in disassembled form and can be assembled with ease at the desired site. Therefore, the housing of the invention provides an advantage of easiness in mass production at plants, storage, shipment, assembly, and handling for opening and closing, disassembly, and the like.

The insect trapping adhesive sheet 20 used in the invention has the following structure. The insect trapping adhesive sheet 20 is formed by applying a harmful insect trapping adhesive agent in layers or stripes onto a surface of a sheet-like support body such as paper or a flat plastic sheet.

A known rubber-containing or acrylic adhesive agent is used as the adhesive agent.

Further, the odorant member 22 that emits the odor of an attractant such as a sex pheromone and that is applied to the invention has the following structure. The attractant as an odorous component is not particularly limited as long as the attractant is any type of pheromone such as a sex pheromone and an aggregation pheromone and any odor of a bait that can attract harmful insects. The odorant member 22 may be prepared by coating the attracting component on paper, rubber, porous bodies, high polymer moldings, or the like; or, by impregnating paper, rubber, and the like with such attracting component so that the paper and the like carry such attracting component. Alternatively, a member thus coated or impregnated can have the surfaces thereof covered with a high polymer film so that the bait odor can be emitted gradually.

Experiments were made on the adhesive trap housing 1 using the aforementioned conventional triangle housing 2 and the adhesive trap housing 11 of the invention in order to measure the amount of insects trapped and the like. It was verified from the results of the experiments that a distinctive difference was observed between the capacities of both adhesive trap housings. The experiments were made between Sep. 17 and Oct. 28, 1993 at two golf courses in Hyogo Prefecture, Japan. More specifically, both adhesive trap housings were hung on branches of trees approximately 1.5 m tall to trap blue grass webworm, a Japanese moth. The number of moths trapped as a result of the experiments is shown below in Table 1.

TABLE I

|  | Location A | Location B |
| --- | --- | --- |
| Housing of invention | 278/trap | 189/trap |
| Conventional housing | 117/trap | 76/trap |

As a result of the aforementioned structure and mode of operation, the adhesive trap housing of the invention has the following significant effects.

The housing of the invention allows the tray and the cover to be freely opened and closed by hinges and the like, so that the insect trapping adhesive sheet attached to the inside thereof can be replaced in a simple manner by a single hand. Therefore, the insect trapping adhesive sheet can be replaced with the housing hung on a tree. Moreover, since the retaining pieces are arranged on the tray, the insect trapping adhesive sheet can be attached with ease without using separate clips or the like. Further, since the holes are provided in the bottom plate of the tray, the insect trapping adhesive sheet that is otherwise hard to handle can be removed with ease by taking advantage of such holes.

Since the cover body has rectangular openings, the opening area is increased to allow an increased number of insects to enter. Further, since the ceiling at the substantially middle portion of the cover body is curved and projected inward, an insect that has entered into the housing is caused to fly in an undulating path, thereby contributing to increasing the insect trapping rate brought about by the insect trapping adhesive sheet arranged on the bottom surface thereof.

Lastly, since the tray and the cover body are separate members, the housing of the invention is not only suitable for mass production, but also effective in storage and shipment, as well as extremely easy to assemble and disassemble, etc.

What is claimed is:

1. An adhesive insect trapping housing, for trapping flying insects, utilizing an adhesive sheet disposed within said housing, comprising:

a hollow cover body defining a substantially rectangular opening extending in a longitudinal direction thereof, said cover body having at least three side walls, said side walls including a top side wall, and left and right side walls, a substantially middle portion of said top side wall being curved inwardly as compared to opposite longitudinal end portions of said top side wall, said inwardly curved middle portion extending from said left side wall to said right side wall;

an odorant member, disposed on the interior of said cover body, for attracting insects; and a tray, disposed facing said top side of said cover body, onto which the adhesive sheet is mounted, wherein a first distance from said tray to said inwardly curved middle portion of said top side wall is less than a second distance from said tray to said end portions of said top side wall such that said insects are directed toward said adhesive sheet.

2. An adhesive insect trapping housing according to claim 1, further comprising:

first hinge members disposed substantially at a bottom portion of one of said left side and said right side of said cover body; and second hinge members disposed on said tray and engaging said first hinge members, wherein said tray is pivotably attached to said cover body by engagement of said first and second hinge members.

3. An adhesive insect trapping housing according to claim 1, wherein bird protecting barriers are provided at the openings of the cover body, for preventing birds from entering said housing.

4. An adhesive trap housing according to claim 1, further comprising at least one window, for removing the insect trapping adhesive sheet, provided in said tray.

5. An adhesive trap housing according to claim 1, wherein said cover body is comprised of a front cover half and a rear cover half, said cover halves being provided with projections and corresponding insertion holes, said cover halves fitting together by inserting said projections into said insertion holes.

6. An adhesive trap housing according to claim 2, further comprising engagement members, disposed on said tray on a side opposite said second hinge members and engageable with said cover body, so as to close said cover body with said tray.

7. An adhesive insect trapping housing according to claim 2, wherein bird protecting barriers are provided at the openings of the cover body, for preventing birds from entering said housing.

8. An adhesive trap housing according to claim 2, further comprising at least one window, for removing the insect trapping adhesive sheet, provided in said tray.

9. An adhesive trap housing according to claim 2, wherein retaining pieces for allowing the insect trapping adhesive sheet to be releasably fixed on said tray are provided on an inner face of said tray that faces said top side of said cover body.

10. An adhesive trap housing according to claim 2, wherein said cover body is comprised of a front cover half and a rear cover half, said cover halves being provided with projections and corresponding insertion holes, said cover halves fitting together by inserting said projections into said insertion holes.

11. An adhesive insect trapping housing, for trapping flying insects, utilizing an adhesive sheet disposed within said housing, comprising:

a hollow cover body defining a substantially rectangular opening extending in a longitudinal direction thereof, said cover body having at least three side walls, said side walls including a top side wall, and left and right side walls, a substantially middle portion of said top side wall being curved inwardly as compared to opposite longitudinal end portions of said top side wall;

an odorant member, disposed on the interior of said cover body, for attracting insects; and a tray, disposed facing said top side of said cover body, onto which the adhesive sheet is mounted, wherein a first distance from said tray to said inwardly curved middle portion of said top side wall is less than a second distance from said tray to said end portions of said top side wall such that said insects are directed toward said adhesive sheet; and retaining pieces for allowing the insect trapping adhesive sheet to be releasably fixed to said tray are provided on an inner face of said tray that faces said top side of said cover body.

12. An adhesive trap housing for trapping flying insects, utilizing an adhesive sheet disposed within said housing, comprising:

a hollow cover body, having at least three sides, said sides being a top side, a left side, and a right side, a substantially middle portion of said top side being curved and projecting inward;

an odorant member, disposed on the interior of said cover body, for attracting insects; and a tray, disposed facing said top side of said cover body, onto which the adhesive sheet is mounted, wherein said housing has a first end and a second end, said ends being open to air and having substantially rectangular openings, wherein retaining pieces for allowing the insect trapping adhesive sheet to be releasably fixed to said tray are provided on an inner face of said tray that faces said top side of said cover body.

13. An adhesive trap housing for trapping flying insects, utilizing an adhesive sheet disposed within said housing, comprising:

a hollow cover body, having at least three sides, said sides being a top side, a left side, and a right side, a substantially middle portion of said top side being curved and projecting inward;

an odorant member, disposed on the interior of said cover body, for attracting insects; and a tray, disposed facing said top side of said cover body, onto which the adhesive sheet is mounted, wherein said housing has a first end and a second end, said ends being open to air and having substantially rectangular openings;

first hinge members disposed substantially at a bottom portion of one of said left side and said right side of said cover body; and second hinge members disposed on said tray and engaging said first hinge members, wherein said tray is pivotably attached to said cover body by engagement of said first and second hinge members, and wherein retaining pieces for allowing the insect trapping adhesive sheet to be releasably fixed on said tray are provided on an inner face of said tray that faces said top side of said cover body.

* * * * *